United States Patent
Xue et al.

(10) Patent No.: US 7,316,561 B2
(45) Date of Patent: Jan. 8, 2008

(54) THREE-PIECE MOLDING MANIFOLD

(75) Inventors: Lijue Xue, London (CA); Glen Robert Campbell, London (CA); Manuel J. Gomes, Flamborough (CA)

(73) Assignee: National Research Council of Canada, Ottawa, Ont.

( * ) Notice: Subject to any disclaimer, the term of this patent is extended or adjusted under 35 U.S.C. 154(b) by 266 days.

(21) Appl. No.: 11/237,750

(22) Filed: Sep. 29, 2005

(65) Prior Publication Data

US 2007/0071846 A1    Mar. 29, 2007

(51) Int. Cl.
*B29C 45/00* (2006.01)

(52) U.S. Cl. .............. 425/572; 264/328.8; 264/328.12; 425/547; 425/588

(58) Field of Classification Search ................ 425/572, 425/547, 588; 264/328.8, 328.12
See application file for complete search history.

(56) References Cited

U.S. PATENT DOCUMENTS

| | | |
|---|---|---|
| 4,648,546 A | 3/1987 | Gellert |
| 4,761,343 A | 8/1988 | Gellert |
| 5,032,078 A * | 7/1991 | Benenati ..................... 425/549 |
| 5,227,179 A | 7/1993 | Benenati |
| 5,496,168 A | 3/1996 | Renwick |
| 6,099,292 A | 8/2000 | McGrevy |
| 6,749,422 B2 | 6/2004 | Yu |

FOREIGN PATENT DOCUMENTS

| | | |
|---|---|---|
| DE | 10 24 3387 | 3/2004 |
| JP | 5200786 | 8/1993 |
| JP | 5200787 | 8/1993 |

* cited by examiner

*Primary Examiner*—Yogendra Gupta
*Assistant Examiner*—Maria Veronica Ewald
(74) *Attorney, Agent, or Firm*—Hans Koenig

(57) ABSTRACT

A hot runner molding manifold has a first half having flow grooves, a cover piece having flow grooves complementary to the flow grooves of the first half, and a second half securable to the first half and having a cavity for receiving the cover piece. The flow grooves of the first half and the cover piece form flow channels for distributing molten material from an inlet port to outlet ports. The cover piece is engaged with the first half, for example by welding, to reduce leakage of molten material out of the flow channels. Heater grooves in the first half, second half or both the first and second halves receive one or more heating elements for heating the flow channels.

14 Claims, 6 Drawing Sheets

THREE-PIECE MOLDING MANIFOLD

FIELD OF THE INVENTION

The present invention relates to molding manifolds, particularly to hot runner manifolds for distributing molten materials to mold cavities.

BACKGROUND OF THE INVENTION

Multi-cavity molding, in particular for injection molding, is widely used for manufacturing multiple parts in a single mold during each cycle. Manifolds are required to direct molten material, e.g. plastics and metals, to a number of outlet ports through flow channels so that the molten material can be directed to multiple cavities to form parts. Hot runner manifolds use electric heating elements to keep the temperature of flow channels at the melting temperature of the molten material. During a production run, the heated material remains molten in the flow channels between shots, hence reducing material waste in the runner system and reducing the amount of finishing work required for the final parts.

Hot runner manifolds are widely used and may be the only economic way to manufacture multiple small parts in one shot. As the hot runner manifolds require embedded electric heating elements to keep the material molten in flow channels, it is critical to ensure that a sound seal is obtained around the flow channels to reduce or eliminate leaking of molten material to the heating elements or the outside of the manifold. In addition, the manifold design preferably allows the heating elements to be placed in such a way that an even temperature gradient across the mold can be achieved.

U.S. Pat. No. 5,496,168 issued Mar. 5, 1996 to Renwick describes a hot runner manifold in which matching grooves are machined in opposing surfaces of two steel plates to form flow channels as well as separated heating element channels. Heating elements and their channels are furnace brazed together, while the matching surfaces of the two steel plates are brazed to form an integrated manifold. This design is complex requiring an inordinate amount of machining to produce the filling ducts/recesses and air ducts leading to heating element channels, and the brazing ducts leading to one matching surface. Further, considerable amount of work is require to tack-weld individual filling tubes in a recess over each filling duct, fill braze powder into the ducts/tubes, and machine out filling tubes after furnace brazing. Furthermore, expensive vacuum furnace equipment is require to braze the heating elements and braze the two halves of the manifold into an integrated unit. Still further, brazing requires heating the entire manifold to about 1925° F., which deteriorates the mechanical properties of the manifold material and may cause deformation of the entire manifold. Yet further, the entire procedure to produce the integrated manifold requires a longer production cycle. Finally, furnace brazing may induce excess brazing material to leak into the flow channel, which will require expensive polishing procedures to clean.

U.S. Pat. No. 4,648,546 issued Mar. 10, 1987 to Gellert describes a composite plate method of manufacturing an integrated hot runner manifold. A manifold having two-halves is machined with matching grooves for flow channels, and another channel is machined on the upper external surface for the heating elements. Furnace brazing is used to seal the heating elements with the channels and to seal the matching surfaces of the two halves of the manifold.

U.S. Pat. No. 4,761,343 issued Aug. 2, 1988 to Gellert describes a manifold system having a bridging composite plate manifold interconnecting a number of support composite plate manifolds with different flow passage orientations to improve streamlined and uniform flow and reduce pressure drop while allowing flexibility of system design for different applications.

U.S. Pat. No. 5,227,179 issued Jul. 13, 1993 to Benenati describes a manifold assembly having interlocking components to contain the high pressure generated in the injection molding presses. A duct structure is designed to provide passages for the heated plastic. The duct contains a tubular member for flow channel, which is embraced by a two-half interlocking conduit cover. Four heating elements are embedded and sealed below the external surfaces at the four corners of the two halves to heat the flow channel. Manufacturing of the individual duct and interlock elements is very labor intensive.

U.S. Pat. No. 6,749,422 issued Jun. 15, 2004 to Yu describes a hot runner manifold having two separable halves with matching grooves to form flow channels. Molten plastic flows through ground channel pipes within the grooves. The flow channels are heated by heaters located in grooves on the external surface of manifold halves. The pipes are covered by copper plates, which act to improve heat transfer from the heaters to the flow channels to keep the plastic in a molten state. Manufacturing interconnected channel pipes is complex and expensive.

In U.S. Pat. Nos. 4,648,546, 4,761,343, 5,227,179 and 6,749,422, all flow channels are located at the matching surfaces of two halves of the manifold, while heating element channels are located on external surfaces. While reducing the risk of plastic leaking into the heater element channels, these designs are costly to manufacture, undesirably large and/or inefficient at heating the flow channels.

U.S. Pat. No. 6,099,292 issued Aug. 8, 2000 to McGrevy describes a hot runner manifold having a single block with flow channels machined therein. A serpentine groove is machined into the surface of the block to accept a heat conductive assembly, the heat conductive assembly being a conduit having a heater element therein. The serpentine groove and heat conductive assembly essentially parallels the path of the flow channels in the block. In this design, the manifold is a single block and the heater element is on the outside surface of the block. While reducing the risk of plastic leaking into the heater element channels, this design is costly to manufacture and inefficient at heating the flow channels.

German Patent Publication 10243387 published Mar. 18, 2004 to Holger describes a hot runner manifold system in which a first hot runner system may be connected to a second hot runner system. Each hot runner system may be a single block with grooves therein or two halves with grooves between them. Electric heater elements are used to heat the flow channels. There is no provision for sealing the flow channels away from the heater elements.

Japanese Patent Publications 5200786 and 5200787 both published Aug. 10, 1993 to Katsutoshi et al, describe a hot runner manifold having two halves in which leakage of resin from the runner is prevented by means of a core inserted into recessed grooves that surround the hot runner in both halves of the manifold. A recession in the core collects resin that leaks between the two halves and the pressure of the resin forces the core to tightly fit into the recessed grooves thereby forming a seal to prevent further leakage of the resin. Such a sealing method is not efficient and prone to failure. Furthermore, this design permits resin to pool in the recession and permits resin pooled in the recession to bleed back into the hot runner channel contaminating subsequent shots of resin. Thus, this design limits the ability to change resin type or color without disassembling the entire manifold.

Despite advances that have been made in the art, there remains a need for improved manifolds for distributing molten material to mold cavities, in particular improved hot runner manifolds in which leakage of molten material from the runners is reduced.

SUMMARY OF THE INVENTION

There is provided a molding manifold comprising: one or more inlet ports and one or more outlet ports; a first half having one or more flow grooves; a cover piece having one or more flow grooves complementary to the flow grooves of the first half, the cover piece covering the one or more flow grooves of the first half, the flow grooves of the first half and cover piece together forming flow channels for distributing molten material from the one or more inlet ports to the one or more outlet ports, the cover piece engaged with the first half to reduce or eliminate leakage of molten material out of the flow channels; a second half having a cavity for receiving the cover piece, the second half securable to the first half; and, one or more heater grooves in the first half, second half or both the first half and second half for receiving one or more heating elements for heating the flow channels.

The cover piece covers the flow grooves of the first half so that molten material is contained within the flow channels. The cover piece is engaged with the first half preferably by welding, bolts, clamps, pressure from the second half, an adhesive, or a combination thereof. Flow channels formed from the flow grooves of the first half and the cover piece are preferably hermetically sealed at an interface between the first half and the cover piece to completely prevent leakage of molten material out of the flow channels. The hermetic seal should be able to withstand the pressure generated by the molten material in the flow channels. In one embodiment, the cover piece is welded to the first half at the interface between the cover piece and the first half.

The cover piece may have any desired size and shape. To promote better sealing, the cover piece preferably has a shape and dimensions that just covers the flow grooves of the first half. Thus, the surface area of the interface between the cover piece and the first half is as small as possible while permitting total coverage of the flow grooves of the first half. Enough of an interface should be provided so that a good seal can be obtained while reducing the possibility of molten material bleeding into the interface between the cover piece and first half. The exact shape and dimensions of the cover piece are a matter of choice by one skilled in the art considering the specific application of the manifold and the specific means for engaging the cover piece with the first half.

Where welding is used to engage the cover piece with the first half, it is advantageous to bevel the edges of the cover piece and the first halfs flow grooves at the interface. Beveling the edges leads to a good weld line without leaving a ridge that could interfere with the way in which the cover piece is accommodated in the cavity of the second half.

The cover piece is received in a cavity of the second half. Preferably, the size and shape of the cavity is complementary to the size and shape of the cover piece so that the cover piece just fits within the cavity. The cavity may be open-topped such that the top surface of the cover piece is flush with or protrudes from the top surface of the second half, or the cavity may surround the cover-piece on three sides. In other embodiments, the cavity may be designed so that the second half surrounds the cover piece at strategic locations with other locations being flush with or protruding from the surface of the second half. In embodiments where the top of the cover-piece is at least partially covered by the second half, pressure exerted by the second half when it is secured to the first half may serve to engage the cover piece with the first half. The second half should not cover the flow grooves of the cover piece.

The second half is securable to the first half by securement means, for example by welding, bolts, clamps, adhesives or a combination thereof. Preferably, the second half has a size and shape complementary to the first half.

Heater grooves in the first half, second half or both the first and second halves receive heating elements for heating the flow channels. The heater grooves preferably follow a similar path as the flow channels. The heater grooves are preferably as close as possible to the flow channels to provide more efficient heating. The cover piece should not cover the heater channels in order to keep the flow channels separate from the heater channels. Since the cover piece reduces or eliminates leakage of molten material out of the flow channels, there is no need to braze the heater grooves or the heating elements in the heater grooves. The heating element is preferably an electric heater coil commonly used in the art. The heater grooves preferably have openings at the edge of the manifold for contact with a power source.

Preferably, the first and second halves have complementary heater grooves on their inner surfaces. Together, the heater grooves of the first and second halves form one or more heater channels for housing the heater elements.

The inlet ports receive molten material from a source. The inlet ports are in fluid communication with the flow channels and the flow channels distribute the molten material to the outlet ports, which are in fluid communication with the flow channels. From the outlet ports molten material is fed into mold cavities for forming objects. There may be any number of inlet and outlet ports. Inlet and outlet ports may be located anywhere on the manifold. The nature of the molding operation will dictate numbers and locations of the inlet and outlet ports.

Preferably, the inlet and outlet ports are oriented parallel to each other and perpendicular to the flow channels. Preferably, the inlet ports are on the top of the manifold and the outlet ports on the bottom. Preferably, the bottom surface of the manifold is an outside surface of the first half and the top of the manifold is an outside surface of the cover piece, the second half or both the cover piece and second half. Preferably the inlet ports are in the cover piece. In one embodiment, there is a single inlet port in the cover piece. The number of outlet ports depends on the number of parts desired to be made in one shot. Preferably, the outlet ports are in the first half.

The molten material may comprise, for example, a plastic (e.g. thermoplastic polymers, elastomers, rubbers, composite polymers, blends thereof, etc.) or a metal (e.g. aluminum, magnesium). The parts of the manifold, i.e. the first half, second half and cover piece, may comprise any suitable material for the particular molding operation desired. For example, for injection molding of plastics the parts of the manifold may comprise, for example, P20 or H13 tool steel, Ramax 2 tool steel or 420 stainless steel. For die casting of metals, the parts of the manifold may comprise, for example, H13 tool steel.

Any welds used to between the cover piece and first half, or between the first half and second half preferably comprise a welding material that is compatible with the material which comprises the manifold parts. Suitable welding processes are generally known to one skilled in the art, for example gas tungsten arc welding (GTAW) and shielded metal arc welding (SMAW). Care should be taken during welding to ensure proper closure of the interface between the first half and the cover piece without distorting the flow channels. Good welding technique ensures that the cover piece will fit properly into the cavity of the second half after welding, and produces weld lines that resist internal pressure in the flow channels without developing warps or cracks. Any bolts used preferably match the strength and coefficient of expansion of the materials used in the manifold parts. Any adhesives used should be compatible with the parts of the manifold.

A process for fabricating a molding manifold comprises: machining a first half to include a plurality of outlet ports and to include flow grooves for flow channels in fluid communication with the outlet ports; machining a cover piece to include an inlet port and to include flow grooves in fluid communication with the inlet port, the flow grooves of the cover piece complementary to the flow grooves of the first half; machining a second half to include a cavity for receiving the cover piece; machining heater grooves into the first half, the second half or both the first and second halves; engaging the cover piece on the first half so that the flow grooves of the first half and the flow grooves of the cover piece match up to form sealed flow channels for molten material; placing one or more heater elements in the heater channels; placing the second half on the first half so that the cover piece fits within the cavity; and, securing the second half to the first half.

In a preferred process for fabricating a manifold of the present invention, a first half is machined to include flow grooves for flow channels, heater grooves for heating elements and outlet ports for molten material. A cover piece is machined to include an inlet port and complementary flow grooves to the flow grooves in the first half. The size of the cover piece is designed to cover the width of the flow channels plus enough distance on each side of the flow channel for welding (e.g. about 0.125 inch). The heater grooves are machined in the first half as close as possible to the flow grooves leaving enough room for a weld between the cover piece and the first half. A second half having the same perimeter dimensions as the first half is machined to include a cavity within which the cover piece may fit, and to include complementary heater grooves to the heater grooves in the first half.

After the individual parts of the manifold are machined, the cover piece is placed on the first half so that the complementary flow grooves match up. A hermetically sealed weld is produced continuously around the perimeter of the cover piece to seal the cover piece to the first half. Heating elements (e.g. electric heating coils) are placed in the heater grooves of the first half. The second half is placed over the first half such that the complementary heater grooves match up with the heating elements encapsulated therein, and the cover piece matches up with and fits within the cavity. The second half is then secured to the first half, for example by stitch welding at points along the perimeter where the first and second halves meet. The cover piece may also be stitch welded to the second half if desired should the cover piece be flush with or protrude beyond the outside surface of the second half. The manifold is then machined to its final dimension.

Three-piece molding manifolds of the present invention advantageously provide greater versatility in design permitting use in a greater variety of applications. Advantageously, manifolds of the present invention seal flow channels away from heating elements while permitting a variety of methods of securing the halves of the manifold together. This provides the option of being able to open the manifold and replace the heating elements without having to damage the manifold. Brazing of the heater channels, brazing of the heating elements in the heater channels and brazing of the two halves together is not required thereby greatly simplifying design and machining of the manifold. Further, since no brazing is required, time consuming post-brazing polishing is also not required. Manifolds may be manufactured more quickly at less cost without a reduction in performance of the manifold.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

Figure 1:
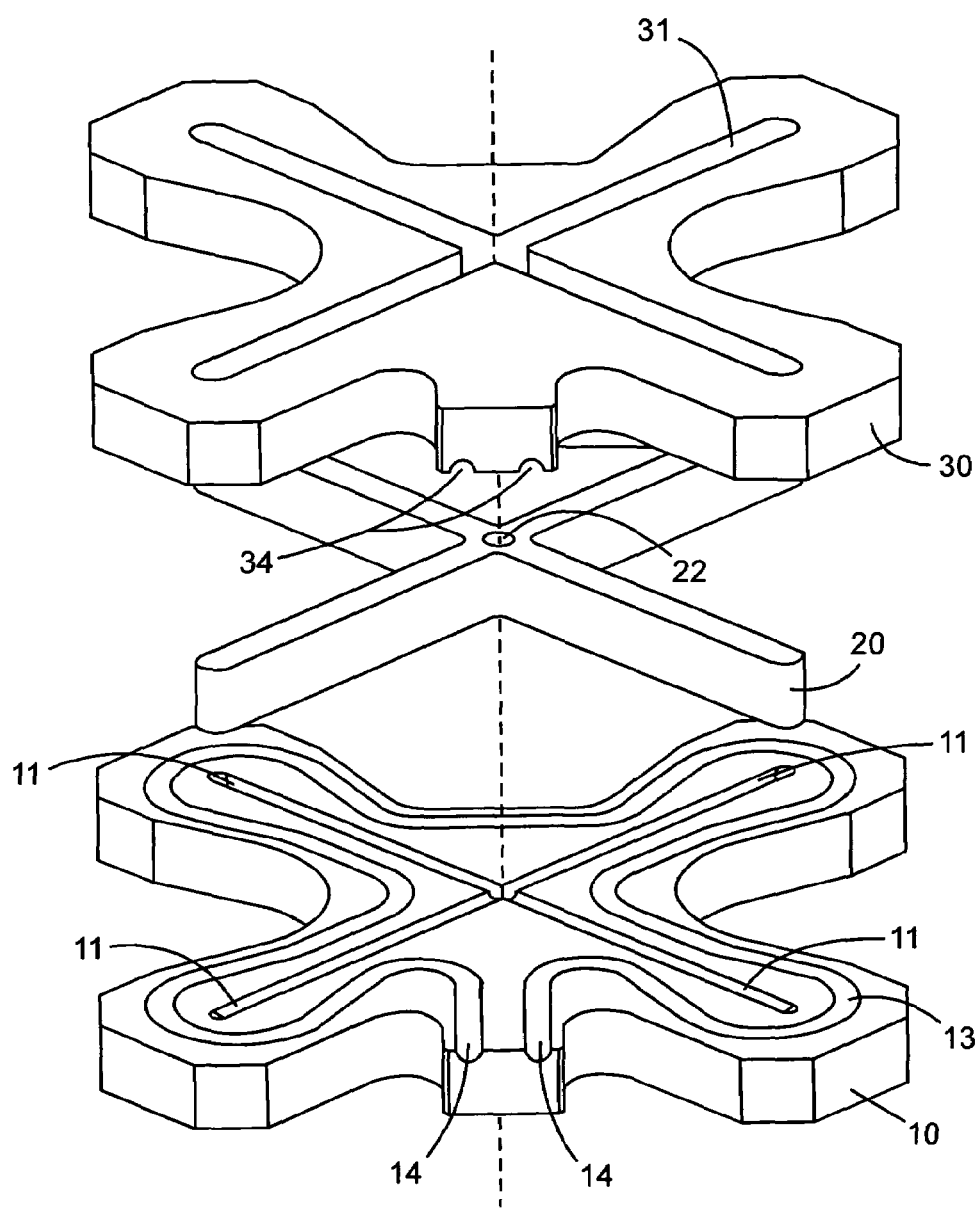
FIG. 1 is an exploded perspective view of a three-piece 4-port manifold in accordance with the present invention showing a first half, a cover piece and a second half.

DESCRIPTION OF PREFERRED
EMBODIMENTS

Referring to FIGS. 1-7, a three-piece 4-port manifold comprises first half 10, cover piece 20 and second half 30. First half 10 comprises flow grooves 11 radiating from a central point and terminating in outlet ports 12. Outlet ports 12 are perpendicular to flow grooves 11 and open out to the bottom of first half 10. First half 10 also has heater groove 13 for receiving an electrical heating coil (not shown). Heater groove 13 terminates at openings 14 through which the terminals of the heater coil may protrude out the side of first half 10.

Figure 3:
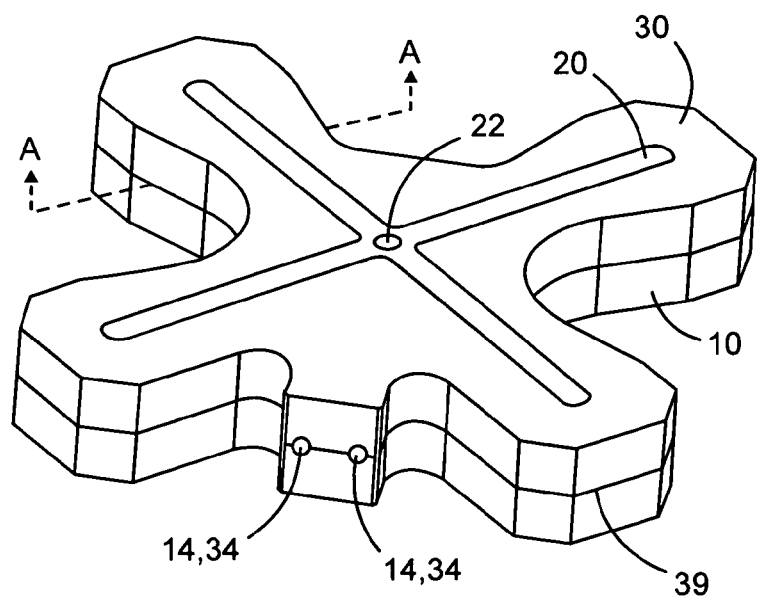
FIG. 3 is a perspective view showing the manifold of FIG. 1 in an assembled configuration.
Figure 4:
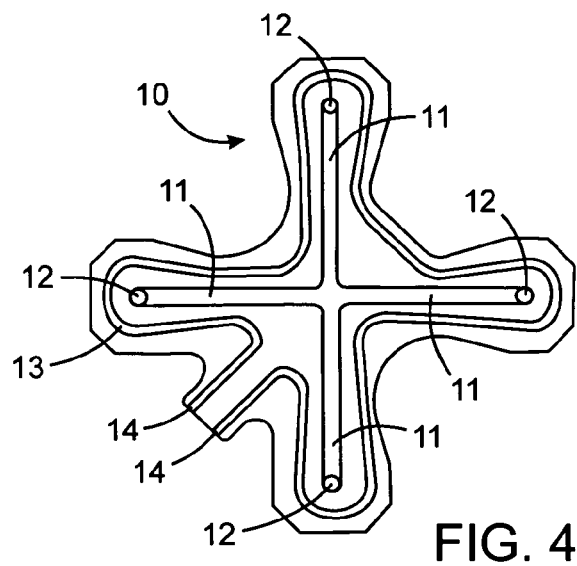
FIG. 4 is a top view of the first half of the manifold of FIG. 1.
Figure 5:
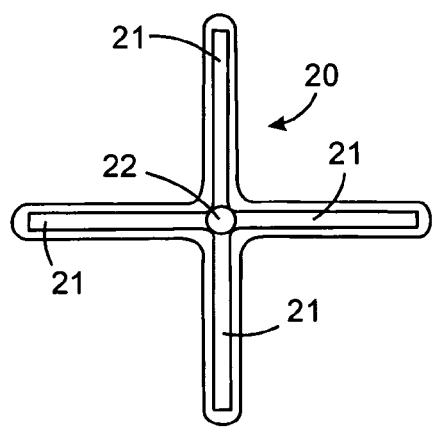
FIG. 5 is a bottom view of the cover piece of the manifold of FIG. 1.
Figure 6:
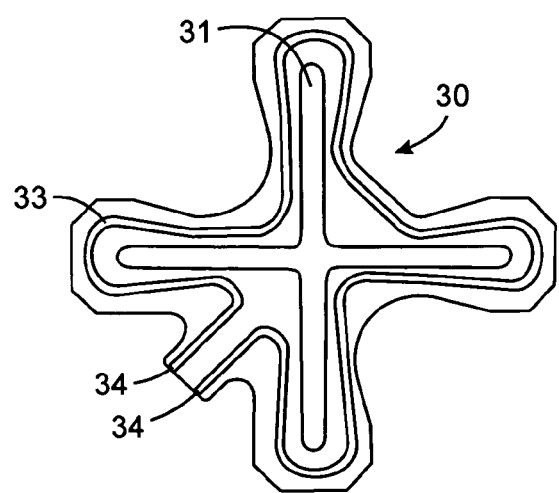
FIG. 6 is a bottom view of the second half of the manifold of FIG. 1.
Figure 7:
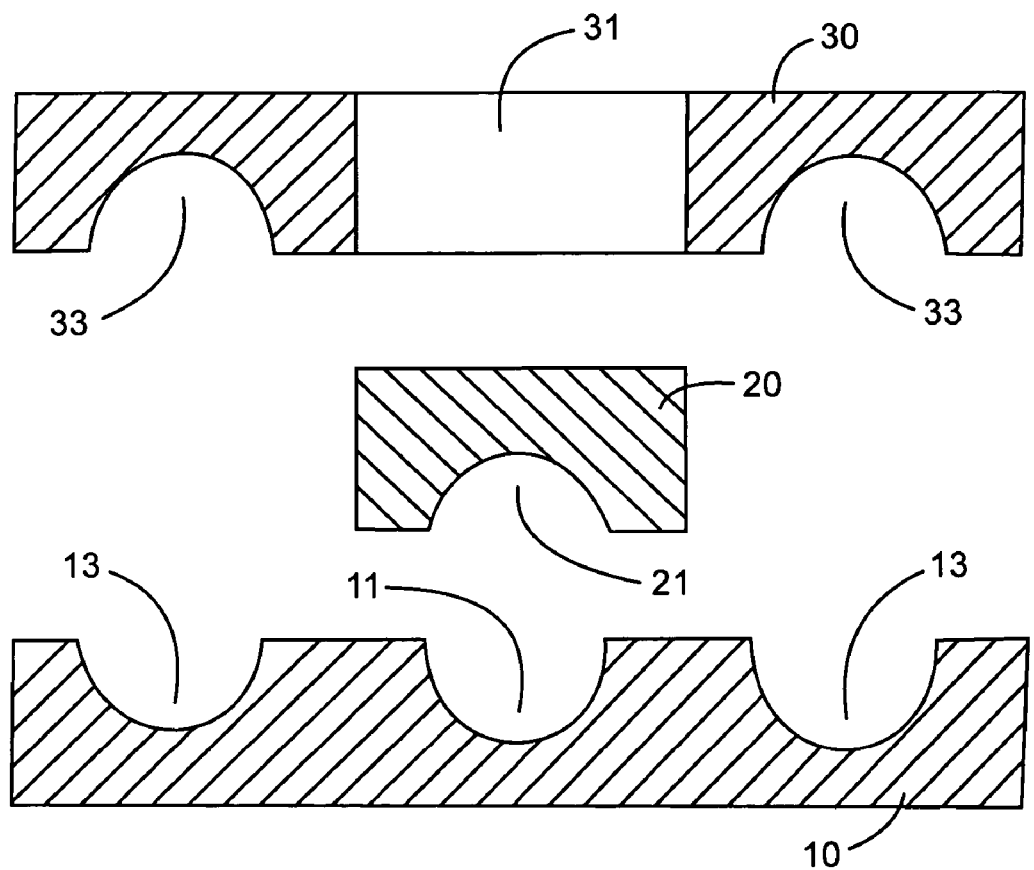
FIG. 7 is an exploded cross-sectional view through A-A of FIG. 3.

Cover piece 20 comprises flow grooves 21 complementary to flow grooves 11 on first half 10. When assembled as shown in FIG. 3, flow grooves 11 match up with flow grooves 21 as illustrated in FIG. 7 to form flow channels through which molten plastic may flow. Cover piece 20 comprises central inlet port 22 for receiving molten plastic perpendicular to flow grooves 21. Cover piece 20 is just large enough to accommodate flow grooves 21 and cover flow grooves 11 without covering any part of heater groove 13. The interface between the cover piece and the first half is sealed using welding, cyanoacrylate adhesive or some other fastening methods when the manifold is assembled.

Figure 2:
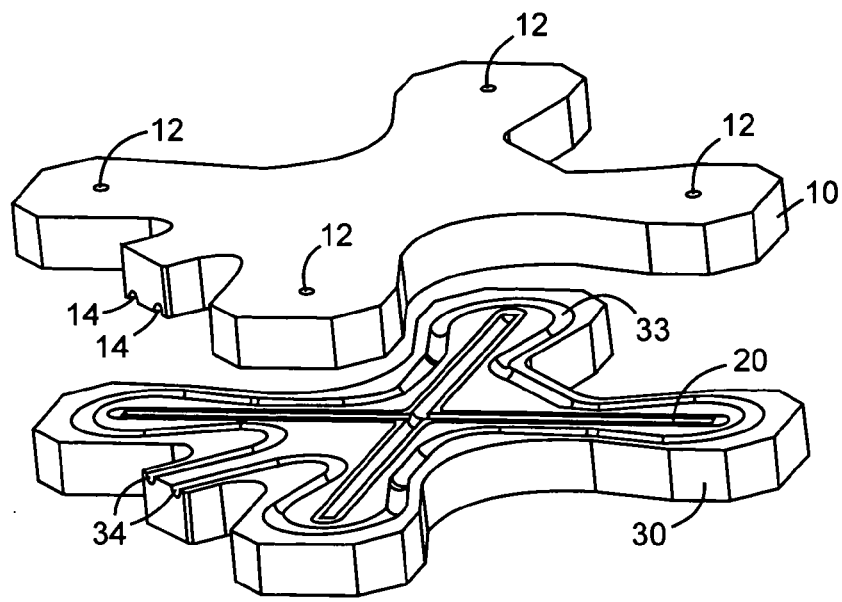
FIG. 2 is an exploded perspective view of the manifold of FIG. 1 in an upside down orientation showing the cover piece inserted within a cavity of the second half.

Top half 30 comprises cavity 31 having a size and shape complementary to cover piece 20. As best seen in FIGS. 2, 3 and 7, cover piece 20 fits snugly in cavity 31 so that the top of the cover piece is flush with the top of the second half. Second half 30 also comprises heater groove 33 complementary to heater groove 13 on first half 10. When the manifold is assembled as shown in FIG. 3, heater groove 31 matches up with heater groove 11 as illustrated in FIG. 7 to form a heater channel within which the electrical heating coil (not shown) is encapsulated. Heater groove 31 terminates in openings 34 through which the terminals of the heater coil may protrude out the side of second half 10. Openings 14 and 34 match up when the manifold is assembled. The perimeter of second half 30 has a complementary shape to the perimeter of first half 10. Top half 30 is secured to first half 10 by stitch welding at interface 39 (FIG. 3).

In use, the assembled manifold has an electrical heater coil encapsulated in the heater channel formed from heater grooves 13 and 33. A shot of molten plastic is injected into inlet port 22 and molten plastic is distributed through four flow channels formed from flow grooves 11 and 21 to be forced out through the four outlet ports 22 into four mold cavities where plastic objects are formed. The mold cavities are replaced with empty mold cavities and another shot of molten plastic is delivered in the same manner. The heater coil keeps the plastic molten during the process so that shots may be made consecutively without opening the manifold. Should the heater coil malfunction, the second half of the manifold may be separated from the first half to replace the heater coil without opening the flow channels, therefore, the manifold may be used again.

Figure 8:
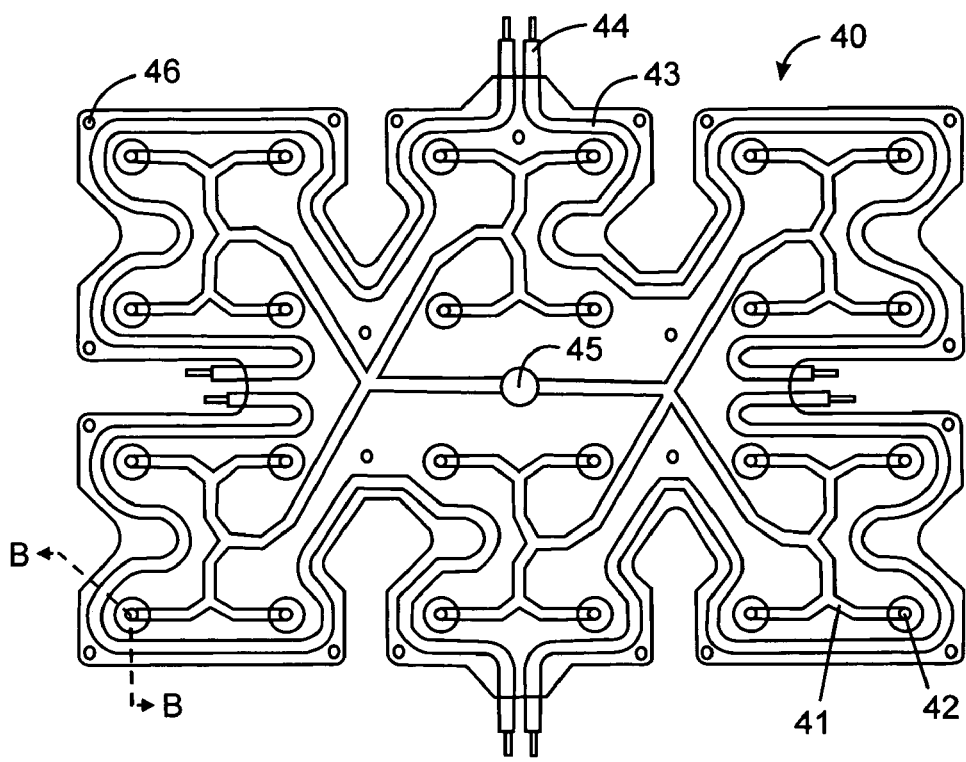
FIG. 8 is a top schematic view of a three-piece 24-port manifold in accordance with the present invention.

FIG. 8 is a schematic representation of a three-piece 24-port manifold 40 having 24 outlet ports 42 (only one labeled) in the first half in fluid communication with a plurality of flow channels 41. A single central inlet port 45 in the cover piece is in fluid communication with the flow channels and receives molten plastic from an injection machine. Molten plastic injected into the inlet port is distributed through the flow channels and out the 24 outlet ports into 24 mold cavities. Four heater coils 44 (only one labeled) in four heater channels 43 (only one labeled) follow the general path of the flow channels and maintain the plastic in the flow channels in a molten state. The second half is secured to the first half by a plurality of bolts 46 (only one labeled).

Figure 9:
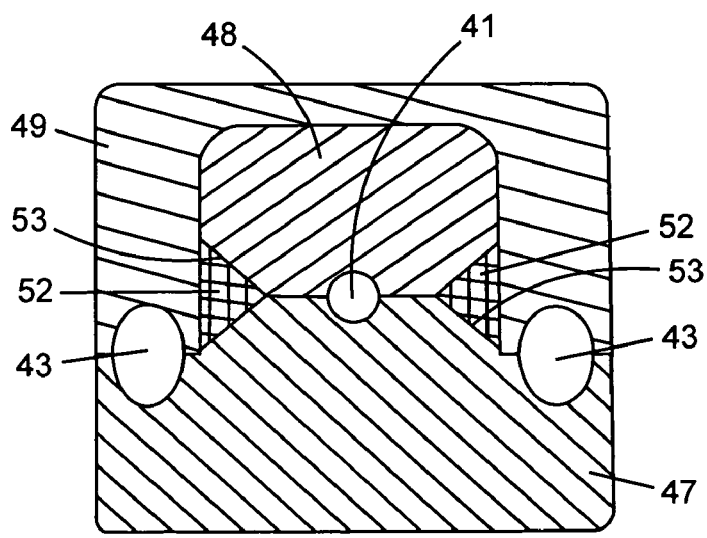
FIG. 9 is a cross-sectional view taken through B-B of FIG. 8.

FIG. 9 depicts a cross-section through B-B of FIG. 8 illustrating the relationship between first half 47, cover piece 48 and second half 49 of the manifold. Flow channel 41 is formed from matching flow grooves in cover piece 48 and first half 47. Heater channel 43 is formed from matching heater grooves in first half 47 and second half 49. Cover piece 48 has a size that just covers flow channel 41 without covering heater channel 43. Cover piece 48 and first half 47 have beveled edges 53 at the interface between the cover piece and the first half. Beveled edges 53 permit welding at the interface to produce hermetically sealed weld lines 52 that are flush with the edge of cover piece 48. This permits cover piece 48 to fit snugly into a cavity in second half 49 while permitting second half 49 and first half 47 to meet perfectly. Top half 49 overtops cover piece 48 to provide further engagement of cover piece 48 with first half 47.

Figure 10:
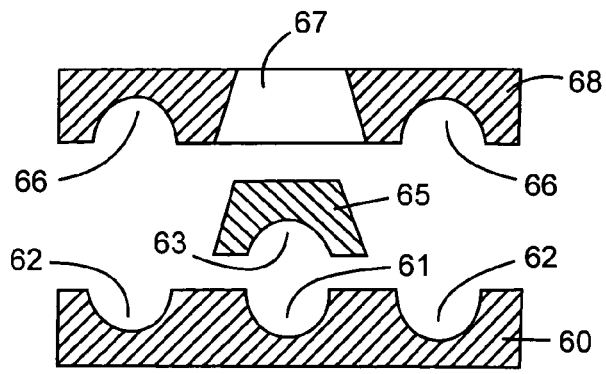
FIG. 10 is an exploded cross-sectional view of an arm of alternate embodiment of a manifold of the present invention.
Figure 11:
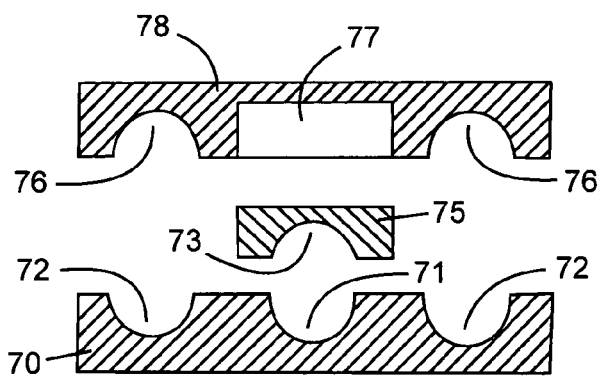
FIG. 11 is an exploded cross-sectional view of an arm of another alternate embodiment of a manifold of the present invention; and, FIG. 12 is an exploded cross-sectional view of an arm of yet another alternate embodiment of a manifold of the present invention.
Figure 12:
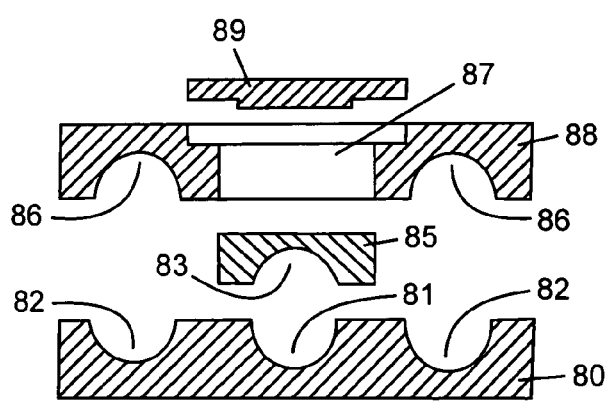

FIGS. 10-12 illustrate exploded cross-sectional views of three alternate embodiments of manifolds of the present invention having cavities and cover pieces with different shapes and constructions.

The embodiment illustrated in FIG. 10 has cover piece 65 and complementary cavity 67 that are generally trapezoidal in cross-section. The sloping edges of the trapezoid permit second half 68 to apply pressure to cover piece 65 when second half 68 is secured to first half 60 to provide better sealing engagement of the cover piece to the first half. Flow grooves 61 in the first half match flow grooves 63 in the cover piece to form flow channels. Heater groove 62 in the first half matches heater groove 66 in the second half to form a heater channel.

The embodiment illustrated in FIG. 11 has cover piece 75 that fits into roofed cavity 77 in second half 78. Such an arrangement permits second half 78 to apply pressure to cover piece 75 when second half 78 is secured to first half 70 to provide better sealing engagement of the cover piece to the first half. Flow grooves 71 in the first half match flow grooves 73 in the cover piece to form flow channels. Heater groove 72 in the first half matches heater groove 76 in the second half to form a heater channel.

The embodiment illustrated in FIG. 12 has cover piece 85 that fits into roofed cavity 87 in second half 88. Such an arrangement permits second half 88 to apply pressure to cover piece 85 when second half 88 is secured to first half 80 to provide better sealing engagement of the cover piece to the first half. Further, roof 89 of cavity 87 is removable to provide access to cover piece 85 and to facilitate placement of second half 88 over cover piece 85 when assembling the manifold. Flow grooves 81 in the first half match flow grooves 83 in the cover piece to form flow channels. Heater groove 82 in the first half matches heater groove 86 in the second half to form a heater channel.

Other advantages which are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:
1. A molding manifold comprising:
(a) one or more inlet ports and one or more outlet ports;
(b) a first half having one or more flow grooves;
(c) a cover piece having one or more flow grooves complementary to the flow grooves of the first half, the cover piece covering the one or more flow grooves of the first half, the flow grooves of the first half and cover piece together forming flow channels for distributing molten material from the one or more inlet ports to the one or more outlet ports, the cover piece engaged with the first half to reduce or eliminate leakage of molten material out of the flow channels;
(d) a second half having a cavity for receiving the cover piece, the second half securable to the first half; and,
(e) one or more heater grooves in the first half, second half or both the first half and second half for receiving one or more heating elements for heating the flow channels.

2. The manifold of claim 1, wherein the flow channels are hermetically sealed at an interface between the first half and the cover piece.

3. The manifold of claim 1, wherein the cover piece is engaged to the first half by welding, bolts, clamps, pressure from the second half, an adhesive, or a combination thereof.

4. The manifold of claim 1, wherein the cover piece is welded to the first half at an interface between the cover piece and the first half.

5. The manifold of claim 4, wherein the cover piece and the first half have beveled edges at the interface.

6. The manifold of claim 1, wherein the cover piece has a shape and dimensions that just covers the one or more flow grooves of the first half.

7. The manifold of claim 1, wherein the first half and the second half have complementary size and shape.

8. The manifold of claim 1, wherein the second half is securable to the first half by welding, bolts, clamps or a combination thereof.

9. The manifold of claim 1, wherein the cavity has a size and shape complementary to the cover piece.

10. The manifold of claim 1, wherein the one or more inlet ports is in the cover piece and the one or more outlet ports is in the first half.

11. The manifold of claim 1, wherein the one or more outlet ports and the one or more inlet ports are perpendicular to the flow channels.

12. The manifold of claim 1, wherein the first and second halves have complementary heater grooves that together form one or more heater channels for housing the one or more heating elements.

13. The manifold of claim 1, wherein the molten material comprises a plastic or a metal.

14. A process for fabricating a molding manifold comprising:
   (a) machining a first half to include a plurality of outlet ports and to include flow grooves for flow channels in fluid communication with the outlet ports;
   (b) machining a cover piece to include an inlet port and to include flow grooves in fluid communication with the inlet port, the flow grooves of the cover piece complementary to the flow grooves of the first half;
   (c) machining a second half to include a cavity for receiving the cover piece;
   (d) machining heater grooves into the first half, the second half or both the first and second halves;
   (e) engaging the cover piece on the first half so that the flow grooves of the first half and the flow grooves of the cover piece match up to form sealed flow channels for molten material;
   (f) placing one or more heater elements in the heater channels;
   (g) placing the second half on the first half so that the cover piece fits within the cavity; and,
   (h) securing the second half to the first half.

* * * * *